(12) United States Patent
Wu et al.

(10) Patent No.: US 12,456,479 B1
(45) Date of Patent: Oct. 28, 2025

(54) AUDIO PLAYBACK AND SOFTWARE MIXER DESIGN IN DSP WITH SOFTWARE TIME-SYNCHRONIZED PLAYBACK

(71) Applicant: AMAZON TECHNOLOGIES, INC., Seattle, WA (US)

(72) Inventors: Tianhe Wu, San Jose, CA (US); Qiao Mu, Beijing (CN); Karthik Raghavan, Sunnyvale, CA (US); Noah Guengerich, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 175 days.

(21) Appl. No.: 18/504,357

(22) Filed: Nov. 8, 2023

(51) Int. Cl.
G10L 21/055 (2013.01)
H04B 17/364 (2015.01)
H04L 65/80 (2022.01)

(52) U.S. Cl.
CPC .......... *G10L 21/055* (2013.01); *H04B 17/364* (2015.01); *H04L 65/80* (2013.01)

(58) Field of Classification Search
None
See application file for complete search history.

(56) References Cited

U.S. PATENT DOCUMENTS

| | | | | |
|---|---|---|---|---|
| 4,255,814 A * | 3/1981 | Osborn | ............. | H04B 7/24 455/526 |
| 10,116,989 B1 * | 10/2018 | Shen | ............. | H04L 65/80 |
| 2005/0047417 A1 * | 3/2005 | Lee | ............. | H04N 21/4305 370/235 |
| 2005/0195720 A1 * | 9/2005 | Nagatani | ............. | G11B 20/18 |
| 2007/0186145 A1 * | 8/2007 | Ojala | ............. | G10L 21/04 704/E21.017 |
| 2011/0093628 A1 * | 4/2011 | Bulgin | ............. | G06F 5/14 710/56 |
| 2011/0150099 A1 * | 6/2011 | Owen | ............. | H04N 21/2662 375/240.26 |
| 2014/0358264 A1 * | 12/2014 | Long | ............. | H04L 1/1838 700/94 |
| 2018/0376105 A1 * | 12/2018 | Davies | ............. | H04L 65/403 |
| 2021/0014596 A1 * | 1/2021 | Sun | ............. | H04R 1/1016 |
| 2022/0217425 A1 * | 7/2022 | Thagadur Shivappa | ............. | H04L 65/1069 |
| 2024/0142562 A1 * | 5/2024 | Zorgui | ............. | H04W 64/00 |

OTHER PUBLICATIONS

"HiFi 5 DSP", cadence, 7 pgs., Retrieved from the Internet: URL: https://www.cadence.com/en_US/home/tools/ip/tensilica-ip/hifi-dsps/hifi-5.html.

* cited by examiner

*Primary Examiner* — Peter Vincent Agustin
(74) *Attorney, Agent, or Firm* — Lindauer Law, PLLC

(57) ABSTRACT

A device determines estimated playback latency data that may then be used to synchronize audio presentation with other devices. Playback audio data is stored in a buffer by an application processor. A digital signal processor (DSP) retrieves frames of audio data from the buffer. The DSP may generate ultrasonic audio data and mix the playback audio data with the ultrasonic audio data. The mixed data is then sent to an audio output front end the presents the audio data that is audible to a user and the ultrasonic audio that is not. The estimated playback latency data is determined based on a buffer data quantity and a time since a last frame was consumed by the DSP. Given the estimated playback latency data, presentation of subsequent frames may be synchronized by advancing or delaying their write to the buffer, resulting in playback at a specified time.

20 Claims, 5 Drawing Sheets

300

| MEMORY PRIORITY DATA 118 | |
|---|---|
| PRIORITY 302 | PROCESS 304 |
| 1 | Camera Data Read/Write |
| 2 | IPC Buffer Read/Write (playback audio) |
| 3 | Rendered Video Read/Write |
| ... | ... |

| EXECUTION PRIORITY DATA 152 | |
|---|---|
| PRIORITY 312 | PROCESS 314 |
| 1 | Read input audio data and copy into local DSP buffer |
| 2 | Upsample playback audio data |
| 3 | Mix playback and ultrasonic audio data Generate |
| 4 | ultrasonic audio data |
| 5 | Filter input audio |
| 6 | Apply beamformer to input audio |
| ... | ... |

FIG. 3

AUDIO PLAYBACK AND SOFTWARE MIXER DESIGN IN DSP WITH SOFTWARE TIME-SYNCHRONIZED PLAYBACK

BACKGROUND

Presentation of output of a device may be synchronized to a specified time.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 3 illustrates data associated with operation of the device, according to some implementations.

Figure 1:
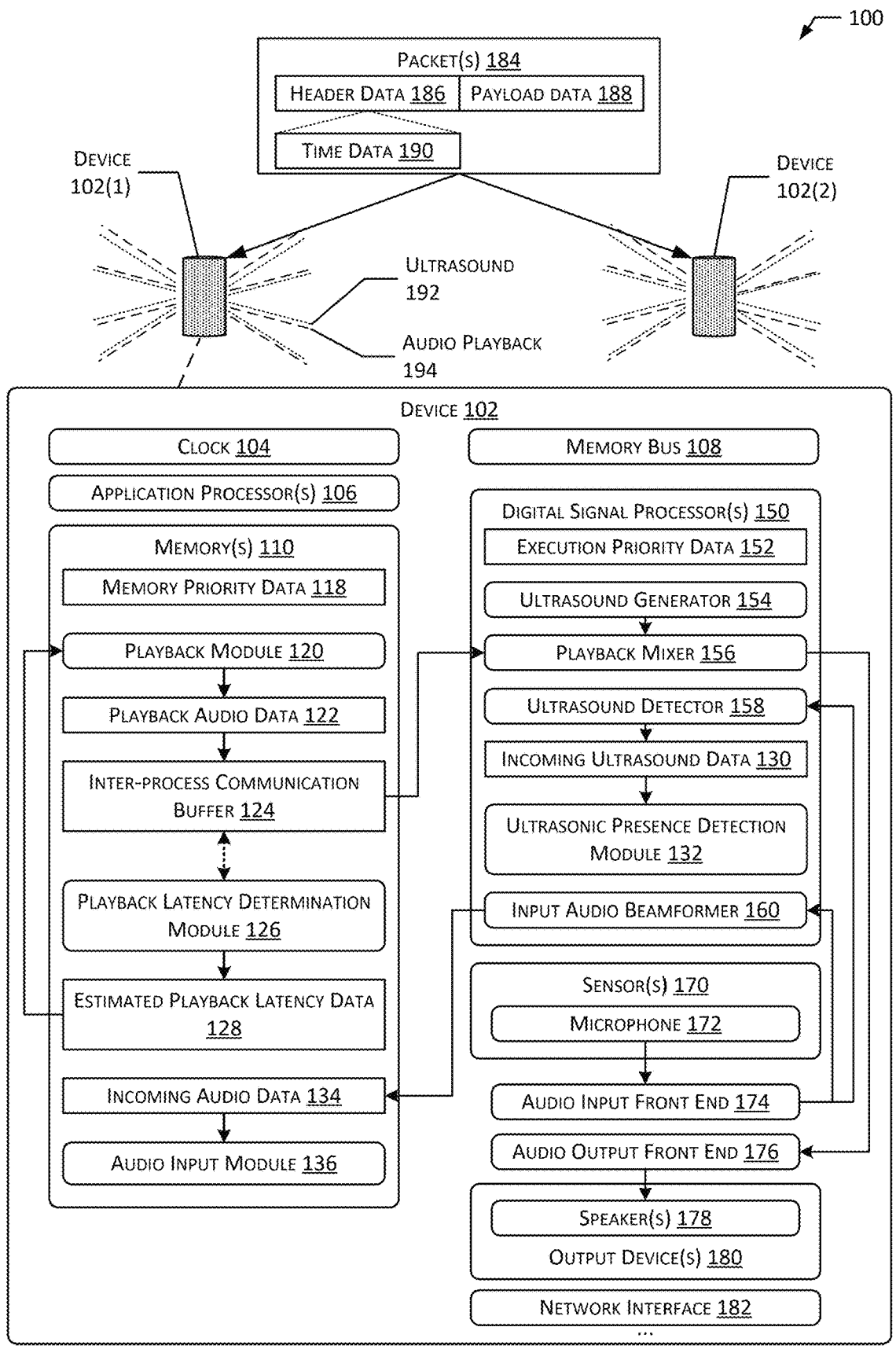
FIG. 1 illustrates a system that includes a device using a software mixer design in a digital signal processor (DSP) to provide time-synchronized playback of audio or other content, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A network-enabled device located in a home, business, and so forth may be capable of performing various tasks. These tasks may include presenting audio content via speakers, acquiring audio input via microphones, and so forth.

Some tasks involve operations that are time sensitive. One task may involve presentation of audio content from different speakers to provide effects such as multi-channel stereo effects that are facilitated by time synchronization. For example, if a first device plays a portion of the audio content before a second device, this may be perceived by a user as an undesirable echo.

Another task that is time sensitive may involve ultrasonic presence detection that determines if a user is near the device using ultrasonic sound. For example, a speaker on the device may be used to emit ultrasonic sounds and a microphone on the device detects a reflection of that ultrasonic sound, providing data about how far away an object such as a user is.

The timing associated with performing these tasks may be coordinated by the device's local clock. In some situations, the local clock may be synchronized to an external clock. For example, several devices may synchronize their local clocks to a common clock, providing a common timebase for synchronized presentation of audio.

The device takes some time for digitized audio data to be processed and converted into an analog signal that is then amplified and used to drive a speaker. Information about this time delay, or latency, may be used to present audio at a particular time. For example, if the processing of audio for playback is known to introduce a delay of six milliseconds, audio data may be sent six milliseconds before a desired time to present that audio, resulting in playback at the desired time.

Traditional techniques to characterize the latency of audio output have involved solutions that are intensive in terms of hardware, software, or both. For example, audio processing hardware may be designed to add timestamps to audio data as it is processed. This provides useful latency data, but requires specialized and expensive hardware that is not cost-effective. In another example, software may track portions of audio data during processing, creating, and assessing timestamps to determine latency data. However, this adds software overhead, consuming additional computing resources such as memory and processor cycles. This added overhead may not be feasible or desirable on a resource-constrained computing device.

Described in this disclosure is a system and technique that provides estimated playback latency data that is highly accurate. The estimated playback latency data may then be used to provide presentation of audio output at a specified time. Playback audio data is stored in a buffer by an application processor (AP). A digital signal processor (DSP) retrieves frames of audio data from the buffer. The AP and the DSP may access the memory via a memory bus. The memory bus may be operated to prioritize operations involving the buffer. For example, a memory controller may utilize quality of service (QOS) data to permit reads and writes to the buffer to supersede other usage of the memory bus.

The DSP may mix other audio output for presentation at the same time as the playback audio data. In one implementation, the device may utilize ultrasonic presence detection. In this implementation, the DSP may generate ultrasonic audio data such as pulses, chirps, or other waveforms at specified frequencies and intervals. The other audio output, such as the ultrasonic audio data, may be mixed with playback audio data retrieved from the buffer. The mixed data is then sent to an audio output front end that presents the audio data that is audible to a user and the ultrasonic audio. For example, the audio output front end may comprise a digital-to-analog converter and an amplifier that provides an analog signal to drive a speaker.

In addition to the mixing of the audio for presentation, the DSP may perform other processes. In one implementation the execution priority of processes associated with the playback audio data may be prioritized over other processes, such as those processing input audio data acquired using one or more microphones. For example, mixing of the playback audio data and the ultrasonic audio data may be prioritized over an ultrasound detector process to detect ultrasound pulses in acquired input audio or an input audio beamformer process.

The estimated playback latency data is determined based on a buffer data quantity and a time since a last frame of playback audio data was consumed by the DSP. For example, a frame of data is consumed by the DSP when the DSP retrieves that frame of data from the buffer, and the frame of data is removed from the buffer. Other information, such as the sample rate of the playback audio and the sample size may also be used. Given these inputs, the estimated playback latency data may be determined using interpolation based on previously stored lookup data, a specified mathematical relationship, and so forth.

With the estimated playback latency data now determined, presentation of subsequent frames may be synchronized. For example, the AP may adjust the time at which subsequent frames of playback audio data are written to the buffer by advancing or delaying them to produce playback at a specified time. The use of the estimated playback latency data may provide synchronization of audio with a time variation of less than 200 microseconds. By using the techniques and devices described herein, the user experience is improved when presenting playback audio from a plurality of devices, performance of the ultrasonic presence detection may be improved due to tighter time constraints on the emitted ultrasonic signals, and so forth.

Illustrative System

FIG. 1 illustrates a system 100 that includes a device 102 using a software mixer design in a DSP to provide time-synchronized playback of audio or other content, according to some implementations.

A pair of devices 102(1)-(2) are depicted. Two devices are shown for ease of illustration, and not as a limitation. Each device 102 may present as output ultrasound 192, audio playback 194, or both. For example, ultrasound 192 may comprise audio signals having a frequency of at least 20 kilohertz (kHz) while the audio playback 194 comprises audio signals having a frequency of less than 20 kHz. In some implementations the output may be received from another device. For example, a plurality of packets 184 may be sent to the devices 102(N) for presentation. Each packet 184 may comprise header data 186 and payload data 188. The header data 186 may include time data 190 that is indicative of what time the presentation should occur at. The payload data 188 may comprise audio data for presentation, such as playback audio data 122. In some implementations, during synchronized operation, two or more devices 102 may present one or more of ultrasound 192 or audio playback 194 at the same time, or within some relatively short time window.

The device 102 may comprise various components.

One or more clocks 104 may provide information indicative of date, time, ticks, and so forth. The clocks 104 may be used to coordinate operation of various components, such as the application processor(s) 106, memory bus 108, memory 110, digital signal processor(s) (DSPs) 150, and so forth. Output from the clock 104 may be used to associate a particular time with an action, to determine when to perform an action, and so forth. In some implementations one or more of the clocks 104 may be synchronized with an external time reference, such as another device's clock.

The device 102 may include one or more application processors 106 (APs) configured to execute one or more stored instructions. The APs 106 may comprise one or more cores. The APs 106 may include systems on a chip, field programmable gate arrays, general processing units, and so forth.

The device 102 includes one or more memories 110. The memory 110 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 110 provides storage of computer-readable instructions, data structures, program modules, and other data for the operation of the device 102. The memory 110 may comprise one or more of dynamic random access memory (DRAM) or static random access memory (SRAM).

A memory bus 108 may connect the memory 110 to other components, such as the APs 106, DSPs 150, and so forth. These other components may read data from, or write data to, the memory 110 via the memory bus 108. In some implementations a memory controller (not shown) may be used to manage operation of the memory bus 108. The memory controller may implement a quality of service (QOS) mechanism in which access to the memory bus 108 is prioritized to specified components or executing processes as specified by memory priority data 118. For example, the memory controller may prioritize access to particular memory locations, such as those used to buffer data being read by the DSP 150. In another example, the memory controller may prioritize access to a particular component, such as prioritizing read operations by the DSP 150. In some implementations, access to the memory 110 that has a lesser or lower priority may be delayed or rejected. The memory priority data 118 may be stored in the memory 110.

The device 102 may include one or more digital signal processors (DSPs) 150 configured to execute one or more stored instructions. The DSPs 150 may comprise one or more cores. The DSPs 150 may comprise a specialized processor that is designed to perform one or more processing operations on data that represents audio signals. Compared to an AP 106, the DSP 150 may be able to perform particular processing operations with lower latency and while using less power. The processes provided by the DSP 150 may replace the use of dedicated analog circuitry. For example, instead of analog oscillators, the DSP 150 may implement a signal generator that is able to generate ultrasonic audio data representative of ultrasonic signals. In another example, instead of analog mixer circuitry, the DSP 150 may execute a mixer process that accepts two or more sets of audio data and provides output that represents a mix of those two or more sets.

The DSP 150 may be coupled to one or more of an audio input front end 174 or an audio output front end 176. The audio input front end 174 comprises circuitry that processes analog signals acquired from a sensor 170 such as a microphone 172 and provides as output digitized data representing the input. For example, the audio input front end 174 may comprise filtering circuitry and an analog-to-digital converter.

The audio output front end 176 comprises circuitry that processes digitized data and provides as output analog signals that drive an output device 180 such as a speaker 178 to produce ultrasound 192 or audio playback 194. For example, the audio output front end 176 may comprise a digital-to-analog converter and amplifier that provides an analog signal to drive the speaker 178.

One or more modules may be stored in the memory 110. These modules may be executed on the APs 106 as foreground applications, background tasks, daemons, and so forth.

A playback module 120 may be used to present audio playback. For example, the playback module 120 may, responsive to user input, begin writing playback audio data 122 to a buffer location in the memory 110, such as the inter-process communication (IPC) buffer ("buffer") 124. The buffer 124 may comprise one or more memory locations that are allocated within the memory 110. The playback module 120 may also receive estimated playback latency data 128. Data may be written to, and read from, the buffer 124 in increments of one or more frames. A frame may comprise a plurality of samples of audio data. For example, a frame may comprise one-hundred and fifty samples.

The estimated playback latency data 128 is indicative of an estimated delay in presentation of audio output. In one implementation, the estimated delay may be indicative of a time interval from writing a frame of audio data to the buffer 124 until presentation by a speaker 178. In other implementations the estimated delay may be indicative of other time intervals, such as from read of a frame of audio data from the buffer 124 until data is sent to the audio output front end 176. Based on the estimated playback latency data 128, the playback module 120 may determine when to write playback audio data 122 to the buffer 124, to provide presentation of the output at a specified time. For example, the playback module 120 may process incoming packets 184 to acquire time data 190 and payload data 188 comprising playback audio data 122. Based on the time data 190 and the estimated playback latency data 128 a time may be determined when playback audio data 122 is to be written to the buffer 124.

As described above, use of the memory bus 108 to write to the buffer 124 may be prioritized over other operations. For example, the memory controller may prioritize a write operation by the AP 106 to the memory locations in the memory 110 that are allocated to the buffer 124. By prioritizing access to the memory bus 108, operation of the device 102 is constrained, reducing variations in presentation latency that may result from contention on the memory bus 108.

During operation, the DSP 150 retrieves playback audio data 122 from the buffer 124. For example, the DSP 150 may be instructed to check the buffer 124 and retrieve any data therein. In some implementations, one or more of the memory controller or the AP 106 may determine a time when data was last consumed or retrieved by the DSP 150 from the buffer 124. For example, a frame of data is consumed by the DSP 150 when the DSP 150 retrieves that frame of data from the buffer 124 and it is processed. In conjunction with a current time, the time when data was last consumed may be used to determine a time since last data consumed by the DSP 150.

A playback latency determination module 126 accepts as input one or more characteristics about the buffer 124 and determines as output estimated playback latency data 128. The estimated playback latency data 128 is an estimate of the latency resulting in operation of the DSP 150 and, in some implementations including operation of the audio output front end 176, to present one or more of the ultrasound 192 or the audio playback 194 using one or more speakers 178. Operation of the playback latency determination module 128 is discussed with regard to FIG. 4.

Incoming audio data 134 from the DSP 150 may be processed by an audio input module 136. For example, the incoming audio data 134 may be processed by the audio input module 136 to determine the presence of a "wake word" that triggers one or more actions by the device 102.

The memory 110 may include other modules to perform other functions.

The DSP 150 may execute one or more instructions to perform various processing operations. For example, the DSP 150 may execute instructions to provide processing operations such as ultrasound generator 154, playback mixer 156, ultrasound detector 158, input audio beamformer 160, output filter, input filter, and so forth. In some implementations, processing operations may be prioritized. Execution priority data 152 may specify which processing operations are to be prioritized over others. In one implementation, the execution priority data 152 may specify that operations associated with playback audio are prioritized over those associated with input audio. For example, processing by the playback mixer 156 may be prioritized over the input audio beamformer 160. By prioritizing the processing operations associated with playback audio, operation of the device 102 is constrained, reducing variations in presentation latency that may result from operations on the DSP 150.

The ultrasound generator 154 generates ultrasonic audio data such as pulses, chirps, or other waveforms at specified frequencies and intervals. For example, the ultrasound generator 154 generates ultrasonic pulses, that when emitted by the speaker 178 may be reflected and detected by the microphone 172.

The playback mixer 156 combines two or more sets of input data and provides a single output. The playback mixer 156 may provide the functionality equivalent to analog mixer hardware. For example, the playback mixer 156 may accept as input playback audio data 122 retrieved from the buffer 124 and ultrasonic audio data generated by the ultrasound generator 154 and generate output data that includes representations of the signals therein.

The ultrasonic audio data and the playback audio data 122 may be combined for contemporaneous presentation because the ultrasound 192 represented by the ultrasonic audio data is inaudible to users. By mixing the two, the device 102 is able to provide audible output while still emitting ultrasound 192 for use in ultrasonic presence detection.

The output data from the playback mixer 156 may be provided to the audio output front end 176 that drives the speaker(s) 178 to present one or more of the ultrasound 192 or the audio playback 194.

With regard to incoming audio, the audio input front end 174 provides input audio data to the DSP 150. The DSP 150 may use various processing operations on the input audio data. For example, the ultrasound detector 158 may determine if a reflected ultrasound 192 pulse or chirp, such as generated by the ultrasound generator 154, is detected in the input audio data. In another example, the input audio beamformer 160 may implement one or more beamforming algorithms to produce directional gain using input audio data acquired from an array of microphones 172.

The ultrasound detector 158 may determine incoming ultrasound data 130 that is then processed an ultrasonic presence detection module 132 executing on the DSP 150 to determine presence data. For example, the incoming ultrasound data 130 may comprise information indicative of a time difference between an emitted ultrasound 192 pulse and a detected echo or reflection of that ultrasound 192 pulse. The time difference may be used to determine a range to an object, determine a doppler shift due to a moving object, and so forth. For example, if a range to an object decreases from one time to a next time, presence data may be generated indicative of a presence of a user. In another example, if a doppler shift indicates a frequency increase, presence data may be generated indicative of a user approaching.

The memory 110 may include at least one operating system (OS) module (not shown). The OS module is configured to manage hardware resource devices such as communication interfaces, sensors 170, output devices 180, and provide various services to applications or modules executing on the respective processors. The OS module may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Fire OS from Amazon, and so forth.

The device 102 may include one or more network interfaces 182 configured to provide communications between the device 102 and other devices such as other devices 102, content servers, routers, access points, servers, and so forth. The network interfaces 182 may include devices configured to couple to personal area networks (PANs), local area networks (LANs), wireless local area networks (WLANS), wide area networks (WANs), and so forth. For example, the network interfaces 182 may include devices compatible with Ethernet, Wi-Fi, Bluetooth, Bluetooth Low Energy, ZigBee, and so forth. The device 102 may use the network interface(s) 182 to receive packets 184, such as those comprising audio data for presentation at a specified time.

The device 102 may include other components that are not depicted here. For example, the device 102 may include a power supply, battery, wireless power receiver, and so forth to provide electrical power to operate the various components in the device 102.

Figure 2:
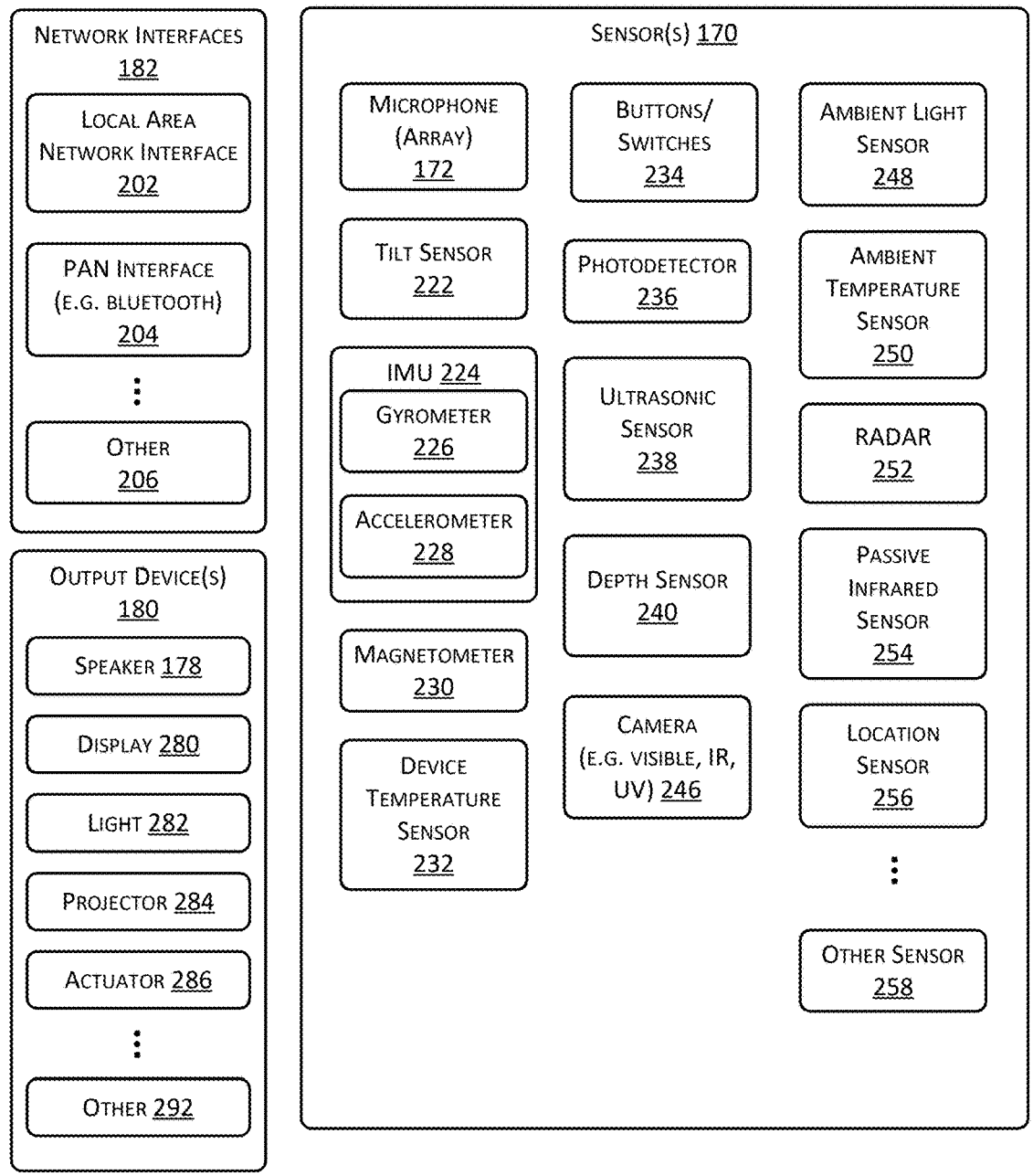
FIG. 2 is a block diagram of some components of the device, according to some implementations.

FIG. 2 is a block diagram 200 of some components of the device 102 such as network interfaces 182, sensors 170, and output devices 180, according to some implementations. The components illustrated here are provided by way of illustration and not necessarily as a limitation. For example, the device 102 may utilize a subset of the particular network interfaces 182, output devices 180, or sensors 170 depicted here, or may utilize components not pictured. One or more of the sensors 170, output devices 180, or a combination thereof may be included on a moveable component that may be panned, tilted, rotated, or any combination thereof with respect to a structure of the device 102.

The network interfaces 182 may include one or more of a local area network interface 202, PAN interface 204, or other 206 interfaces. The local area network interface 202 may be compliant with at least a portion of the Wi-Fi specification. For example, the local area network interface 202 may be compliant with at least a portion of the IEEE 802.11 specification as promulgated by the Institute of Electrical and Electronics Engineers (IEEE). The PAN interface 204 may be compliant with at least a portion of one or more of the Bluetooth, wireless USB, Z-Wave, ZigBee, or other standards. For example, the PAN interface 204 may be compliant with the Bluetooth Low Energy (BLE) specification.

The other 206 network interfaces may include other equipment to send or receive data using other wavelengths or phenomena. For example, the other 206 network interface may include an ultrasonic transceiver used to send data as ultrasonic sounds, a visible light system that communicates by modulating a visible light source such as a light-emitting diode, and so forth. In another example, the other 206 network interface may comprise a wireless wide area network (WWAN) interface or a wireless cellular data network interface. Continuing the example, the other 206 network interface may be compliant with at least a portion of the 5G, 6G, LTE, or other standards.

The device 102 may include one or more of the following sensors 170. The sensors 170 depicted here are provided by way of illustration and not necessarily as a limitation. It is understood that other sensors 170 may be included or utilized by the device 102, while some sensors 170 may be omitted in some configurations.

A tilt sensor 222 provides sensor data indicative of a relative tilt with respect to local vertical. In some implementations, the tilt sensor 222 may comprise a clinometer. The tilt sensor 222 may comprise one or more MEMS devices, a conductive fluid and an electrical contacts mechanism, and so forth. For example, the tilt sensor 222 may distinguish if the device 102 is in the first orientation or the second orientation.

An inertial measurement unit (IMU) 224 may comprise a prepackaged solid state unit that comprises one or more gyrometers 226, accelerometers 228, and so forth. In other implementations, discrete components, such as a discrete accelerometer 228 may be used.

The gyrometer 226 may provide sensor data indicative of rotation of an object affixed thereto. For example, a gyrometer 226 may generate sensor data that is indicative of a change in orientation of the device 102 or a portion thereof.

The accelerometer 228 provides sensor data indicative of a direction and magnitude of an imposed acceleration. Data such as rate of change, or determination of changes in direction, speed, and so forth may be determined using the accelerometer 228. The accelerometer 228 may comprise mechanical, optical, micro-electromechanical, or other devices. For example, the gyrometer 226 in the accelerometer 228 may comprise a prepackaged solid-state IMU 224 that provides multiple axis gyrometers 226 and accelerometers 228.

A magnetometer 230 may be used to determine sensor data indicative of an orientation by measuring ambient magnetic fields, such as the terrestrial magnetic field. For example, the magnetometer 230 may comprise a Hall effect transistor that provides output compass data indicative of a magnetic heading.

One or more device temperature sensors 232 may be utilized by the device 102. The device temperature sensors 232 provide sensor data indicative of temperature of one or more components within the device 102. For example, a device temperature sensor 232 may indicate a temperature of one or more the camera 246, processor in the sensor module, processor in a main structure of the device 102, and so forth. In the event the temperature exceeds a threshold value, the component associated with that device temperature sensor 232 may be shut down. For example, the threshold value may be determined based on component specifications, such as a maximum permissible temperature of the batteries.

One or more buttons or switches 234 allow sensor data indicative of manual input. The buttons or switches 234 may comprise mechanical switches, electronic switches, capacitive switches, and so forth.

A photodetector 236 provides sensor data indicative of impinging light. For example, the photodetector 236 may provide data indicative of a color, intensity, duration, and so forth. In some implementations, the photodetector 236 may detect infrared light that is transmitted by a remote control to operate the device 102.

An ultrasonic sensor 238 determines sensor data using sounds in excess of 20 kHz to determine a distance from the sensor 170 to an object. The ultrasonic sensor 238 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 238 may provide information indicative of a presence of an object, distance to the object, and so forth. Two or more ultrasonic sensors 238 may be utilized in conjunction with one another to determine a location within a two-dimensional plane of the object. In some implementations, the ultrasonic sensor 238 may comprise the microphone(s) 172 and speakers 178.

In some implementations, the ultrasonic sensor 238 or a portion thereof may be used to provide other functionality. For example, the emitter of the ultrasonic sensor 238 may be used to transmit data and the detector may be used to receive data transmitted that is ultrasonic sound. In another example, the emitter of an ultrasonic sensor 238 may be set to a particular frequency and used to generate a particular waveform such as a sawtooth pattern to provide a signal that is audible to an animal, such as a dog or a cat.

A depth sensor 240 may provide sensor data indicative of one or more of a presence or absence of an object, a distance to the object, or characteristics of the object. The depth sensor 240 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The depth sensor 240 may utilize one or more sensing elements.

In another implementation, a structured light pattern may be provided by the optical emitter. A portion of the structured light pattern may then be detected on the object using a sensor 170 such as an image sensor or camera 246. Based on an apparent distance between the features of the structured light pattern, the distance to the object may be calculated.

In another implementation, the depth sensor 240 may use a coded aperture to determine sensor data indicative of distance. In yet another implementation, a variable focus technique may be used to determine distance. With this technique, the focus of a camera 246 is changed. Based on the blurriness or sharpness of a particular portion and given information about focus settings, a distance to an object may be determined.

In other implementations, other techniques may also be used to determine distance to the object. In some implementations, the depth sensor 240 may operate as a depth camera, providing a two-dimensional image of a scene, as well as data that indicates a distance to each pixel.

A plurality of microphones 172 may be used to acquire sensor data representative of sound present in the environment. The microphones 172 may be arranged into an array. These arrays may implement beamforming techniques to provide for directionality of gain. The device 102 may use the one or more microphones 172 to acquire information from acoustic tags, accept voice input from users, determine a direction of an utterance, determine ambient noise levels, for voice communication with another user or system, detect a reflection of ultrasonic sound emitted by the speaker 178, and so forth.

A camera 246 generates sensor data indicative of one or more images. The camera 246 may be configured to detect light in one or more wavelengths including, but not limited to, terahertz, infrared, visible, ultraviolet, and so forth. For example, an infrared camera 246 may be sensitive to wavelengths between approximately 700 nanometers and 1 millimeter. The camera 246 may comprise charge coupled devices (CCD), complementary metal oxide semiconductor (CMOS) devices, microbolometers, and so forth. The device 102 may use image data acquired by the camera 246 for object recognition, user communication, and so forth. The camera 246 may be used to acquire visible light, infrared, or other imagery.

An ambient light sensor 248 may comprise one or more photodetectors 236 or other light-sensitive elements that are used to determine sensor data indicative of one or more of the color, intensity, or duration of ambient lighting around the device 102.

An ambient temperature sensor 250 provides information indicative of the temperature of the ambient environment proximate to the device 102. In some implementations, an infrared temperature sensor may be utilized to determine the temperature of another object at a distance.

The sensors 170 may include a radar 252. The radar 252 may be used to provide sensor data indicative of presence or absence, distance, lateral position, and so forth, to an object. In some implementations, the radar 252 may operate at 24 GHz.

The sensors 170 may include a passive infrared (PIR) sensor 254. The PIR sensor 254 may determine sensor data that is indicative of the presence of users, pets, and so forth. For example, the PIR sensor 254 may be configured to detect infrared radiation with wavelengths between 8 and 14 micrometers.

The device 102 may include one or more location sensors 256. The location sensors 256 may comprise an optical, radio, or other navigational system such as a global positioning system (GPS) receiver. For indoor operation, the location sensors 256 may comprise indoor position systems, such as using Wi-Fi Positioning Systems (WPS). The location sensors 256 may provide information indicative of a relative location, such as "living room" or an absolute location such as particular coordinates indicative of latitude and longitude, or displacement with respect to a predefined origin.

The device 102 may include other sensors 258 as well. For example, the other sensors 258 may include a radio frequency identification (RFID) reader, near field communication (NFC) system, and so forth.

The device 102 includes one or more output devices 180. A display 280 presents image data. The display 280 may comprise one or more of a liquid crystal display, LED display, electrophoretic display, cholesteric liquid crystal display, interferometric display, and so forth. The display 280 may be used to present visible information such as graphics, pictures, text, and so forth. In some implementations, the display 280 may comprise a touchscreen that combines a touch sensor and a display 280.

The speakers 178 emit sound.

The device 102 may also include one or more lights 282. The lights 282 may be used to emit photons. The light 282 may comprise an LED, quantum dot device, and so forth.

In some implementations, the device 102 may be equipped with a projector 284. The projector 284 may be able to project an image on a surface, such as a floor, wall, ceiling, and so forth.

The device 102 may include one or more actuators 286. The actuators 286 may comprise an electrically operated mechanism such as one or more of a motor, solenoid, piezoelectric material, electroactive polymer, shapememory alloy, and so forth. An actuator controller may be used to provide a signal or other input that operates one or more of the actuators 286 to produce movement of a moveable component. In one implementation, the actuators 286 may one or more of pan or tilt the device 102 or a portion thereof.

The device 102 may also include other 292 output devices.

FIG. 3 illustrates at 300 data associated with operation of the device, according to some implementations. The memory priority data 118 is shown. In this illustration, the highest priority 302 for use of the memory bus 108 is associated with a process 304 of camera data read/write, and next highest priority 302 read/write operations to the buffer 124, followed by rendered video read/write to the memory 110.

The execution priority data 152 is shown. In this illustration, the highest priority 312(1) is reading input audio data and copying that input audio data into a local buffer of the DSP 150. Next highest priorities 312(2)-(4) are associated with processes 314 associated with processing output to the audio output front end 176 and lower priorities 312(6)-(7) are associated with processing input from the audio input front end 174.

Figure 4:
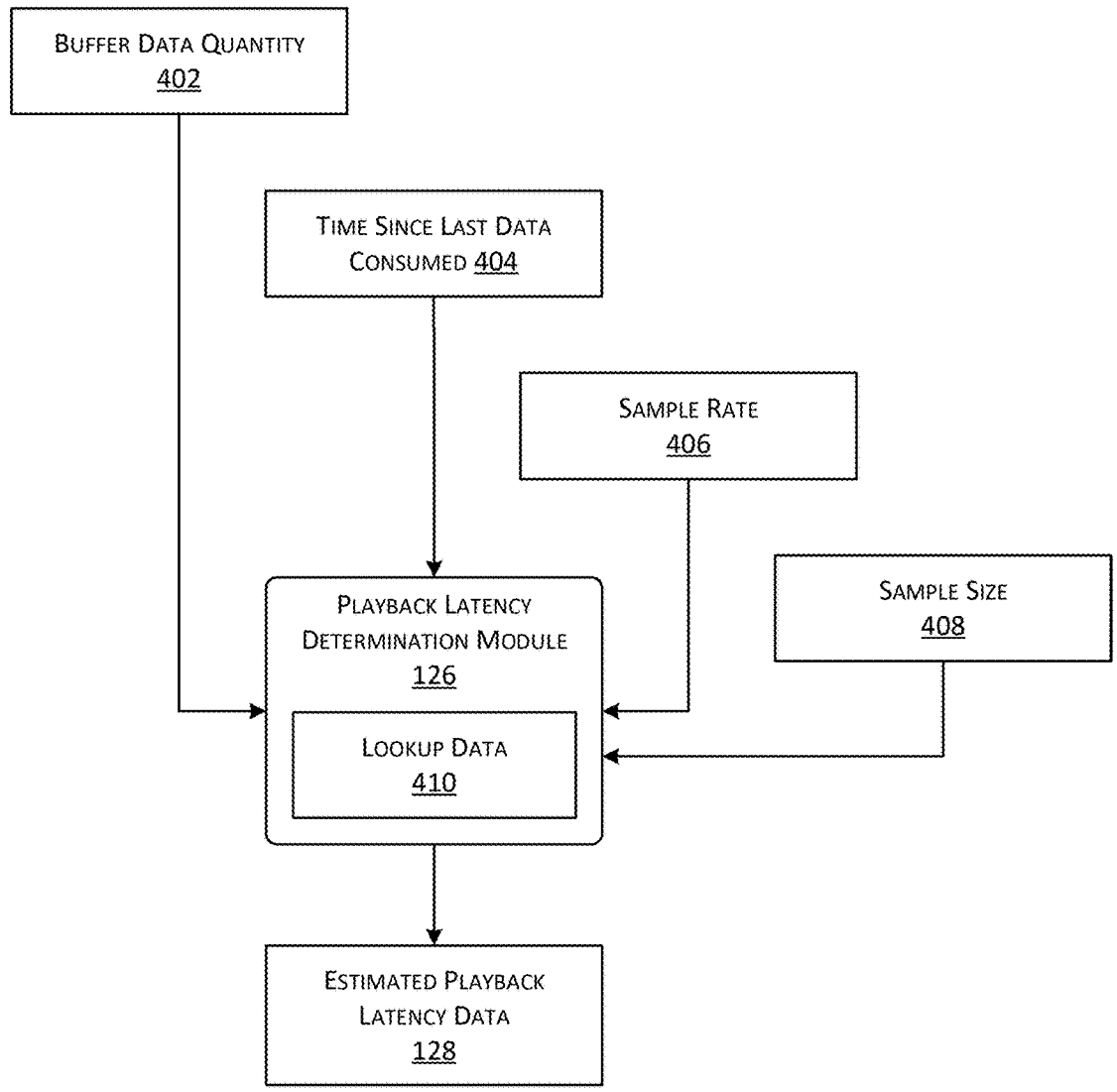
FIG. 4 is a flow diagram of a process to determine estimated playback latency data, according to some implementations.

FIG. 4 is a flow diagram 400 of a process to determine estimated playback latency data 128, according to some implementations. The process may be executed by the AP 106.

The playback latency determination module 126 may accept as inputs one or more characteristics such as buffer data quantity 402, time since last data consumed 404, sample rate 406, or sample size 408.

The buffer data quantity 402 is indicative of a quantity of data stored in the buffer 124. The buffer data quantity 402 may be expressed in terms of frames, samples, bytes, bits, and so forth. For example, the buffer data quantity 402 may indicate the number of frames in the buffer 124 that remain unretrieved by the DSP 150.

The time since last data consumed 404 is indicative of the elapsed time since the last data, such as a frame, was read from the buffer 124 by the DSP 150. The time since last data consumed 404 may be determined based on a time of last retrieval of data by the DSP 150 and a current time. For example, the time since last data consumed 404 may be calculated as a difference between the current time and the time a last frame was consumed.

The sample rate 406 may be indicative of the number of samples per second in the playback audio data 122. For example, the sample rate 406 may be 96,000 samples per second.

The sample size 408 is indicative of a size of each sample of audio data in bits. For example, each sample may comprise 8, 16, or 24 bits.

Given these inputs, the estimated playback latency data 128 may be determined using interpolation based on previously stored lookup data 410, a specified mathematical relationship, and so forth. For example, the lookup data 410 may include various values of the characteristics that are associated with particular values of estimated playback latency. In some implementations, the playback latency determination module 126 may utilize interpolation of the lookup data 410 to determine the estimated playback latency data 128.

In one implementation the estimated playback latency data 128 may be calculated using the following equation:

$$\text{Estimated Playback Latency} = \text{LEN\_IPC} - \text{INTRP\_VAL} + \text{CONST\_CALIB}$$

Where:
LEN_IPC is the buffer data quantity 402 converted into time units,
INTRP_VAL is retrieved from a lookup table based on the buffer data quantity 402 and
the time since last data consumed 404, and
CONST_CALIB is a calibrated constant representative of expected latency of a playback pipeline assuming no underrun/overrun events.

Equation 1

In some implementations, the playback latency determination module 126 may comprise a previously trained machine learning module.

In some implementations, such as shown in FIG. 4, the operation of the playback latency determination module 126 does not utilize information obtained from the DSP 150. Instead, the playback latency determination module 126 uses information about the DSP's interaction with the buffer 124, such as the buffer data quantity 402 and the time since last data consumed 404.

Figure 5:
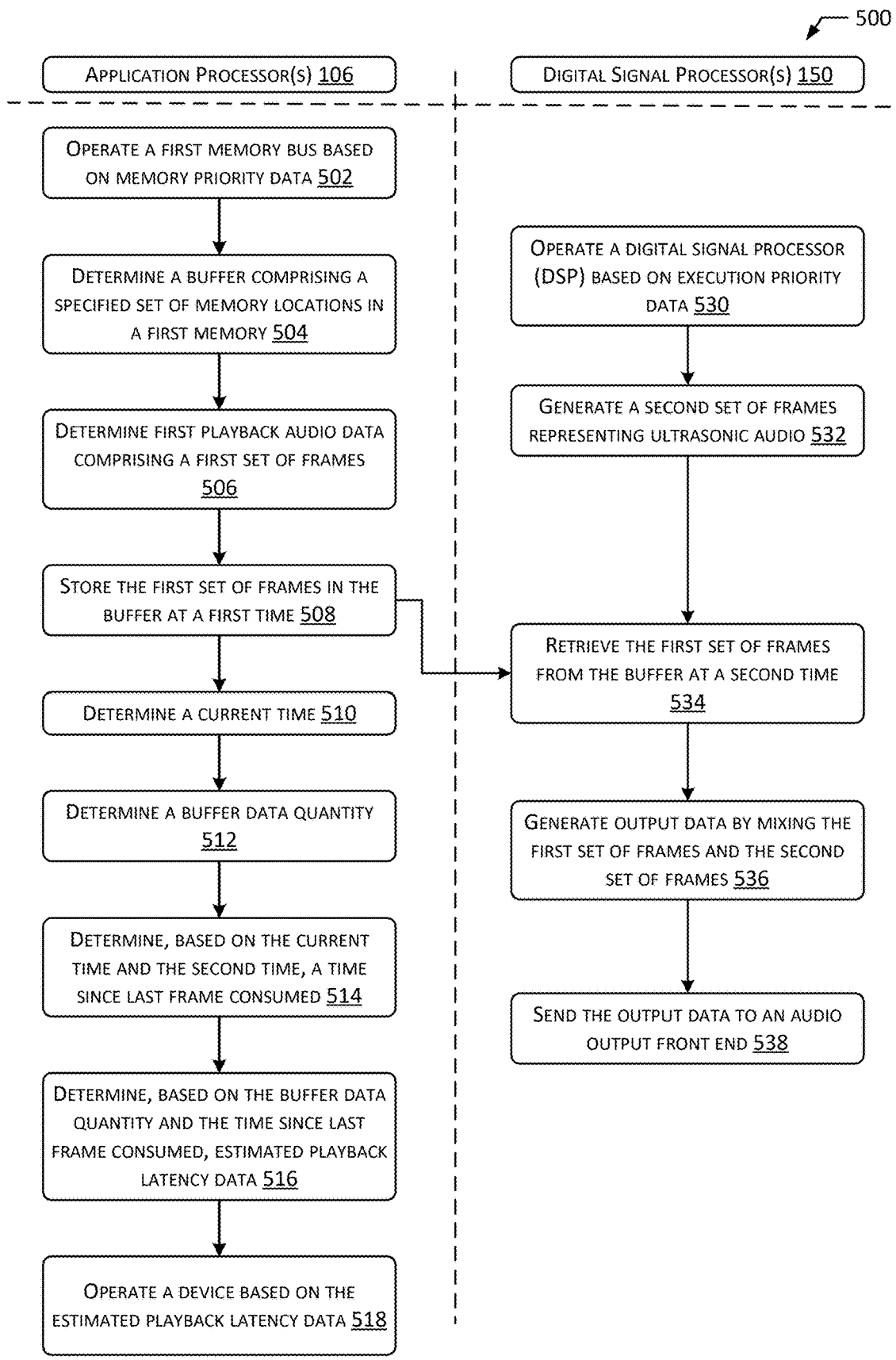
FIG. 5 is a flow diagram of a process to synchronize presentation of playback audio data based on estimated playback latency data, according to some implementations.

FIG. 5 is a flow diagram 500 of a process to synchronize presentation of playback audio data 122 based on estimated playback latency data 128, according to some implementations. In this figure, operations 502-518 associated with the APs 106 are shown on the left and operations 530-538 associated with the DSPs 150 are shown on the right.

With regard to the AP 106, at 502 a first memory bus 108 that is associated with first memory 110 is operated based on memory priority data 118. For example, read/write to the buffer 124 may be prioritized over other transfers of data on the memory bus 108. In one implementation, prioritization of the first memory bus 108 may be specified by the AP 106. For example, the AP 106 may send data to a memory controller that implements the memory priority data 118. In another implementation, individual components on the first memory bus 108 may send their prioritization data to the memory controller. For example, the AP 106 may set a first register within the memory controller, the DSP 150 may set a second register within the memory controller, and so forth.

At 504 the AP 106 determines a buffer 124 comprising a specified set of memory locations in the first memory 110. For example, specific addresses in the memory 110 may be initialized as a buffer 124.

At 506 first playback audio data 122 is determined. The first playback audio data 122 may comprise a first set of frames. As described above, each frame may comprise a plurality of samples of first audio data. The first audio data may be representative of audible signals, such as having frequencies below 20 kHz. In one implementation the first audio data may be received using the network interface 182 as one or more packets 184 from an external device. In another implementation, the first audio data may be retrieved from storage, such as from a solid state disk drive, flash memory, and so forth.

At 508 the first playback audio data 122 is stored in the buffer 124 at a first time. For example, the AP 106 may use the memory bus 108 to access the memory 110 and write the first set of frames in the buffer 124 at the first time.

One or more characteristics associated with the buffer 124 may be determined. For example, the one or more characteristics may comprise the buffer data quantity 402, time since last data consumed 404, and so forth as described above with regard to FIG. 4. Based on the one or more characteristics, estimated playback latency data 128 is determined.

At 510 a current time is determined. For example, the current time may be retrieved from the clock 104.

At 512 the buffer data quantity 402 is determined. For example, the buffer 124 may be inspected to determine how many frames of data remain in the buffer 124.

At 514, based on the current time and a second time (as described at 534), a time since last frame consumed 404 is determined.

At 516, based on the buffer data quantity 402 and the time since last frame consumed 404, estimated playback latency data 128 is determined. The estimated playback latency data 128 is indicative of an estimated delay in presentation of audio output. In one implementation, the estimated delay may be indicative of a time interval from writing a frame of audio data to the buffer 124 until presentation by a speaker 178. In other implementations the estimated delay may be indicative of other time intervals, such as from read of a frame of audio data from the buffer 124 until data is sent to the audio output front end 176.

At 518 the device 102 is operated based at least in part on the estimated playback latency data 128. In one implementation, presentation of the playback audio data 122 is synchronized based on the estimated playback latency data 128. A time reference, such as a real time clock of the device 102 that is synchronized to an external time source, may be determined. A time when presentation of the audio from the speakers 178 is to occur may be specified relative to this time reference. A delay offset may be determined based on a difference between the time indicated by the time reference and the estimated playback latency data 128. This delay offset may then be used to determine when frames are written to the buffer 124. For example, the playback module 120 may control, based on the estimated playback latency data 128, when additional frames of playback audio data 122 are written to the buffer 124. Given the estimated playback latency data 128 and by controlling when frames of playback audio data 122 are written, the time at which those frames of playback audio data 122 are presented by the speakers 178 may be controlled to provide synchronization to provide presentation at a time specified with respect to the time reference.

With regard to the DSP 150, at 530 the DSP 150 is operated based on the execution priority data 152. For example, the processing operations associated with providing data to the audio output front end 176 may be prioritized over processing input from the audio input front end 174. During operation, the DSP 150 may assess a highest priority 302 to storing incoming data to avoid data dropouts. For example, the DSP 150 may receive and store input audio data from the audio input front end 174, and further processing of the input audio data may be subject to the prioritization specified by the execution priority data 152.

At 532 second audio data is determined. For example, the second audio data may comprise ultrasonic sound data generated by the ultrasound generator 154. The second audio data may comprise a second set of frames that represent ultrasonic audio.

At 534 the first playback audio data 122 is retrieved from the buffer 124 at a second time. For example, the DSP 150 may use the memory bus 108 to access the memory 110 and retrieve the first set of frames from the buffer 124 at the second time.

At 536 output data is generated by mixing the first playback audio data 122 and the second audio data. For example, the playback mixer 156 may accept as input the first set of frames and the second set of frames and generate the output data.

At 538 the output data is sent to the audio output front end 176. The audio output front end 176 then operates to drive the speaker(s) 178 to produce one or more of the ultrasound 192 or the audio playback 194, as represented by the output data.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   a first memory;
   an application processor (AP) coupled to the first memory;

a digital signal processor (DSP) coupled to the first memory; and
a speaker coupled to an output of the DSP;
wherein the AP executes instructions to:
   determine first playback audio data comprising a first set of frames;
   at a first time store the first set of frames in a buffer in the first memory;
   determine one or more characteristics associated with operation of the buffer;
   determine, based on the one or more characteristics, an estimated playback latency, wherein the estimated playback latency is indicative of an estimated delay in presentation of audio output; and
   operate the device based at least in part on the estimated playback latency;
wherein the DSP executes instructions to:
   determine second audio data comprising a second set of frames;
   retrieve the first set of frames from the buffer at a second time;
   generate output data by mixing the first set of frames and the second set of frames; and
   send the output data to the speaker.

2. The device of claim 1, wherein the first playback audio data is representative of signals having a frequency of between 0 and 20,000 Hertz and the second audio data is representative of signals having a frequency that is greater than 20,000 Hz.

3. The device of claim 1, wherein:
the AP is coupled to the first memory via a memory bus,
the DSP is coupled to the first memory via the memory bus; and
further comprising:
a memory controller, wherein the memory controller manages access to the memory bus; and
wherein the memory controller is operated to prioritize access to the buffer to store and retrieve the first set of frames.

4. The device of claim 1, further comprising:
a microphone coupled to an input of the DSP; and
wherein the DSP is operated to prioritize the mixing of the first set of frames and the second set of frames over processing of incoming audio data received via the microphone.

5. The device of claim 1, the one or more characteristics comprising one or more of:
buffer data quantity indicative of a quantity of data stored in the buffer,
a time since last frame consumed by the DSP,
a sample rate indicative of samples per unit time used in the first set of frames, or
a sample size indicative of a size of samples of audio data in the first set of frames.

6. The device of claim 1, wherein the AP further executes instructions to:
determine a current time;
determine a quantity of data stored in the buffer;
determine, based on the current time and the second time, a time since last frame consumed by the DSP; and
determine, based on the quantity of data and the time since last frame consumed, the estimated playback latency.

7. The device of claim 1, further comprising:
a clock; and
wherein the AP further executes instructions to:
determine a third time using the clock;
determine, based on the third time and the estimated playback latency, a fourth time;
determine second playback audio data comprising a third set of frames; and
store the third set of frames in the buffer at the fourth time.

8. A method comprising:
determining, using an application processor (AP), first playback audio data comprising a first set of frames;
storing at a first time, using the AP, the first set of frames in a buffer in first memory;
determining, using the AP, one or more characteristics associated with the buffer;
determining, using the AP and based on the one or more characteristics, an estimated playback latency, wherein the estimated playback latency is indicative of an estimated delay in presentation of audio output;
operating the AP based at least in part on the estimated playback latency;
determining, using a digital signal processor (DSP), second audio data comprising a second set of frames;
retrieving, using the DSP, the first set of frames from the buffer at a second time;
generating, using the DSP, output data by mixing the first set of frames and the second set of frames; and
sending, using the DSP, the output data to a speaker.

9. The method of claim 8, wherein the first playback audio data is representative of signals having a frequency of between 0 and 20,000 Hertz and the second audio data is representative of signals having a frequency that is greater than 20,000 Hz.

10. The method of claim 8, further comprising:
operating a memory bus that is coupled to the AP and to the DSP, wherein the memory bus prioritizes access to the buffer to store and retrieve the first set of frames.

11. The method of claim 8, further comprising:
operating the DSP to prioritize processing that is associated with the mixing of the first set of frames and the second set of frames over processing of incoming audio data received via a microphone.

12. The method of claim 8, further comprising:
determining, using the AP, a current time;
determining, using the AP, a quantity of data stored in the buffer;
determining, using the AP and based on the current time and the second time, a time since last frame consumed by the DSP; and
determining, using the AP and based on the quantity of data and the time since last frame consumed, the estimated playback latency.

13. The method of claim 8, further comprising:
determining, using the AP, a time reference;
determining, using the AP and based on the time reference and the estimated playback latency, a third time;
determining, using the AP, second playback audio data comprising a third set of frames; and
storing, using the AP, the third set of frames in the buffer at the third time.

14. A device comprising:
a first memory;
an application processor (AP) coupled to the first memory via a memory bus;
a digital signal processor (DSP) coupled to the first memory via the memory bus; and
a speaker coupled to an output of the DSP;
wherein the AP executes instructions to:
   determine a buffer in the first memory;
   determine first audio data;

store the first audio data in the buffer at a first time;
determine one or more characteristics associated with the buffer; and
determine, based on the one or more characteristics, an estimated playback latency, wherein the estimated playback latency is indicative of an estimated delay in presentation of audio output;
operate the device based at least in part on the estimated playback latency;
wherein the DSP executes instructions to:
determine second audio data;
retrieve the first audio data from the buffer at a second time;
generate output data by mixing the first audio data and the second audio data; and
send the output data to the speaker.

15. The device of claim 14, wherein the first audio data is representative of signals having a frequency of between 0 and 20,000 Hertz and the second audio data is representative of signals having a frequency that is greater than 20,000 Hz.

16. The device of claim 14, wherein the memory bus is operated to prioritize access to the buffer to store and retrieve the first audio data.

17. The device of claim 14, further comprising:
a microphone coupled to an input of the DSP; and
wherein the DSP prioritizes mixing of the first audio data and the second audio data over processing of incoming audio data received via the microphone.

18. The device of claim 14, wherein the AP further executes instructions to:
determine a current time;
determine a quantity of data stored in the buffer;
determine, based on the current time and the second time, a time since last data retrieved by the DSP from the buffer; and
determine, based on the quantity of data and the time since last data retrieved, the estimated playback latency.

19. The device of claim 14, wherein the AP further executes instructions to:
determine a time reference;
determine, based on the time reference and the estimated playback latency, a third time;
determine third audio data; and
store at least a portion of the third audio data in the buffer at the third time.

20. The device of claim 14, wherein:
the first audio data comprises a plurality of frames,
each frame of the plurality of frames comprises a plurality of samples, and
instructions to store and retrieve data from the buffer operate on one or more frames of the plurality of frames.

* * * * *